Figure 1:
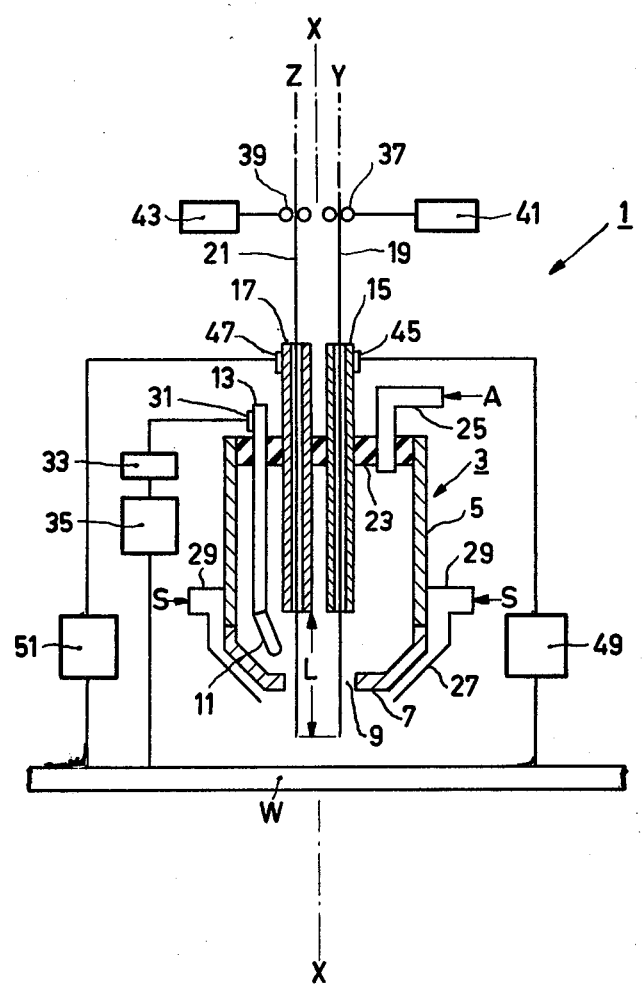

United States Patent

Jelmorini

[11] 4,147,917
[45] Apr. 3, 1979

[54] METHOD AND DEVICE FOR PLASMA-MIG-WELDING

[75] Inventor: Gerardus Jelmorini, Eindhoven, Netherlands

[73] Assignee: U.S. Philips Corporation, New York, N.Y.

[21] Appl. No.: 778,604

[22] Filed: Mar. 17, 1977

[30] Foreign Application Priority Data

Mar. 31, 1976 [NL] Netherlands .................... 7603319

[51] Int. Cl.$^2$ .................................................. B23K 9/00
[52] U.S. Cl. .................................. 219/121 P; 219/75; 219/76.16
[58] Field of Search ............... 219/130, 121 P, 121 R, 219/74, 75, 76.16, 136; 313/231.3

[56] References Cited

U.S. PATENT DOCUMENTS

| | | | |
|---|---|---|---|
| 3,274,371 | 9/1966 | Marz et al. ................... | 219/130 X |
| 3,312,566 | 4/1967 | Winzeler et al. ............. | 219/121 P X |
| 3,746,833 | 7/1973 | Ujiie ............................. | 219/130 X |
| 3,947,607 | 3/1976 | Gazzard et al. .............. | 219/121 P |

FOREIGN PATENT DOCUMENTS

| | | | |
|---|---|---|---|
| 195215 | 5/1957 | Austria ......................... | 219/130 |
| 536605 | 4/1955 | Belgium ....................... | 219/130 |
| U3670 | 1/1955 | Fed. Rep. of Germany .. | 219/130 |
| 40-24362 | 10/1965 | Japan ........................... | 219/130 |
| 773821 | 5/1957 | United Kingdom .......... | 219/74 |
| 898151 | 6/1962 | United Kingdom .......... | 219/74 |

OTHER PUBLICATIONS

"Plasma Mig Welding" 12-1974 by Essers et al. #46 in Welding & Metal Fabrication.

*Primary Examiner*—Bruce A. Reynolds
*Assistant Examiner*—Mort H. Paschall
*Attorney, Agent, or Firm*—Thomas A. Briody; Rolf E. Schneider

[57] ABSTRACT

Plasma-MIG welding involving the use of two parallel consumable electrodes axially introduced into a plasma arc initiated by a non-consumable electrode and out through a nozzle. All three electrodes are maintained at a positive polarity whereby a substantial increase of the deposition rate is achieved, without rotation of the MIG-arcs and without exceeding the critical current intensity.

7 Claims, 4 Drawing Figures

METHOD AND DEVICE FOR PLASMA-MIG-WELDING

This invention relates to a method of and a device for plasma-MIG-welding, where a plasma arc is maintained in a gas flow between a non-consumable plasma electrode and a workpiece, a consumable electrode being axially introduced into the gas plasma, a MIG-arc being maintained between the consumable electrode and the workpiece.

A method of the kind described is already known from U.S. Pat. No. 3,891,824. If this method is used with positive polarity of the plasma electrode and of the consumable electrode, rotation of the MIG-arc and of the end of the consumable electrode occurs above a given current intensity in the consumable electrode, which is referred to as the current intensity. The value of the transition current intensity is substantially dependent on the diameter, the composition, and the extension of the consumable electrode beyond its contact tube. If welding is realized with a current intensity in the consumable electrode which is lower than the said transition current intensity, the MIG-arc does not rotate and remains stationary. In the case of welding with the stationary MIG-arc and with the maximum applicable current intensity, the quantity of material deposited per unit of time is limited by this transition current intensity. Besides the said transition current intensity, there is another, usually higher, critical current intensity above which arc instability occurs and the weld becomes porous.

In the case of negative polarity of the plasma electrode and the consumable electrode, there is also a critical current intensity above which the material transfer is quite less than below this critical current intensity.

The invention has for an object to mitigate these restrictions and to increase the range of application of the plasma-MIG-welding method. This object is achieved in accordance with the invention in that, in a method of the kind described, at least a second consumable electrode is introduced into the same gas plasma in a direction which is substantially parallel to of the first consumable electrode, a MIG-arc also being maintained between the second consumable electrode and the workpiece.

Surprisingly, it has been found that, in spite of the fact that both consumable electrodes are present in the same gas plasma, they exhibit an independent behaviour and may have a different composition, diameter and potential and may be fed at different rates, even if they are connected to the same power supply source.

As far as the transition current intensity, the critical current intensity, and the deposition rate are concerned, for each consumable electrode substantially the same conditions apply as for welding with each of the two electrodes separately; this means that for corresponding parameters, the overall transition current intensity has a higher value. With the method in accordance with the invention, involving welding with two stationary MIG-arcs, current intensities and deposition rates can be realized which are substantially higher than, in some cases twice, those which can be obtained by welding with a single consumable electrode.

It is to be noted that from U.S. Pat. No. 3,248,513 it is known per se to weld with one plasma arc and a plurality of current-carrying welding electrodes. The said problems concerning rotation of the MIG-arcs, do not occur, however, because the welding electrodes are not axially but laterally introduced into the gas plasma; moreover, this method is not suitable for making welded joints.

The invention also relates to a welding torch for performing the method, comprising a housing which is provided with a nozzle having a plasma aperture, a nonconsumable plasma electrode, a first welding wire guide comprising a first contact member, and means for passing a plasma gas through the housing and aperture, the said torch furthermore comprising means for connecting the plasma electrode to a first power supply source, and means for connecting the first contact member to a second power supply source, characterized in that, in the housing, at least a second welding wire guide is arranged substantially parallel to the first welding wire guide. It has been found that the distance between the two wire guides may vary within wide tolerances without substantial variation of the deposition rate, provided that the welding wires to be deposited do not contact each other. A minimum distance between the two welding wires which corresponds to approximately three times the wire diameter has been found to be adequate. The shape of the penetration of the workpiece can be influenced by variation of the distance between the consumable electrodes and of their position relative to the weld.

Various constructions of the contact member are feasible. In a preferred embodiment of the welding torch in accordance with the invention, the second welding wire guide is constructed as a second contact member electrically insulated from the first contact member, the second contact member being provided with means for connecting it to a power supply source. In this embodiment, both welding wires to be deposited may derive their welding current from separate power supply sources via the wire guides which are constructed as respective contact members, with the result that the welding wires can be adjusted to different potentials relative to the gas plasma. The housing of this embodiment should be proportioned so that there is adequate space to accommodate the plasma electrode and the two wire guides.

A further preferred embodiment of the welding torch in accordance with the invention has a more compact and simpler construction because the two wire guides are combined to form a single common contact member which is centrally arranged in the housing. The two welding wires then derive their welding current from the second power supply source via the common contact member.

In both described embodiments the plasma electrode can be centrally or eccentrically arranged in the housing, both wire guides being eccentrically arranged or one wire guide being centrally arranged whilst the other wire guide is eccentrically arranged.

In a further preferred embodiment of the welding torch in accordance with the invention, the nozzle serves as a common contact member, both wire guides being eccentrically arranged in the housing relative to the nozzle, the centre lines of the wire guides being substantially in alignment with the circumference of the plasma aperture. This embodiment enables welding with minimum extension of the two welding wires beyond the nozzle. The two wire guides are eccentrically arranged in the housing in any case. The plasma electrode can be centrally or eccentrically arranged.

Because the nozzle serves as the plasma electrode in a further embodiment of the torch in accordance with the invention, a separate plasma electrode in the housing can be dispensed with, so that a very compact torch construction is achieved.

Embodiments of the invention will now be described in detail, by way of example, with reference to the accompanying drawings, in which FIGS. 1, 2, 3 and 4 show different embodiments of apparatus for performing the method in accordance with the invention. Corresponding elements are denoted by the same references in the drawings.

FIG. 1 shows a device 1, comprising a welding torch 3 provided with a housing 5 provided with a nozzle 7 having a plasma aperture 9. A non-consumable plasma electrode 11 which is made, for example, of tungsten and which is secured on a copper electrode holder 13, is arranged in the housing 5 to be eccentric relative to the central line X—X of the housing and of the nozzle.

A first wire guide 15 and a second wire guide 17, which serve for guiding the welding wires 19 and 21, are arranged in the housing 5 so that their central lines Y and Z are parallel to each other.

The electrode holder 13 with the plasma electrode 11 and the two wire guides 15 and 17 are secured in a cover plate 23 of electrically insulating material, so that they are electrically insulated relative to each other and to the housing. The housing 5 furthermore comprises a connection 25 for the supply of a plasma gas A, for example an inert gas such as argon. A shield 27 with connections 29 serves for the supply and transport of a shielding gas S, for example a mixture of argon and carbon dioxide, which serves to protect the welded joint against oxidation.

The plasma electrode 11 is connected, via a connection terminal 31 on the electrode holder 13 and via a high-frequency generator 33, to the positive pole of a first power supply source 35 which has a drooping voltage-characteristic and whose second pole is connected to a workpiece W to be treated. The two welding wires 19 and 21 are supplied by means of transport rollers 37 and 39, respectively, which are driven at a controllable speed by electric motors 41 and 43, respectively.

In accordance with the invention, the two wire guides are also constructed as contact members for transferring the welding current to the two welding wires, for which purpose they are provided with connection terminals 45 and 47, respectively. The wire guide 15 is connected to the positive pole of a second power supply source 49, whilst the wire guide 17 is connected to the positive pole of a third power supply source 51. The two power supply sources, having a constant voltage-characteristic have their negative pole also connected to the workpiece W.

For the welding of the workpiece W, an inert plasma gas A is supplied, via the connection 25, through the housing 5 and the plasma aperture 9 in the direction of the workpiece W. Via the connections 29 in the shield 27, a shielding gas S is applied. A plasma arc which is struck by means of a high-frequency discharge is maintained in the inert gas flow between the plasma electrode 11 and the workpiece W. A gas plasma is produced by ionization of the inert gas. Two respective MIG-arcs are struck and maintained between the two welding wires 19, 21, axially introduced into the gas plasma, and the workpiece W. The two welding wires are thus deposited in a sheath of plasma gas. The letter L denotes the extension of the welding wires.

As has already been stated, the total quantity of material deposited per unit of time is substantially increased when two or more welding wires are simultaneously deposited in the same gas plasma.

Figure 2:
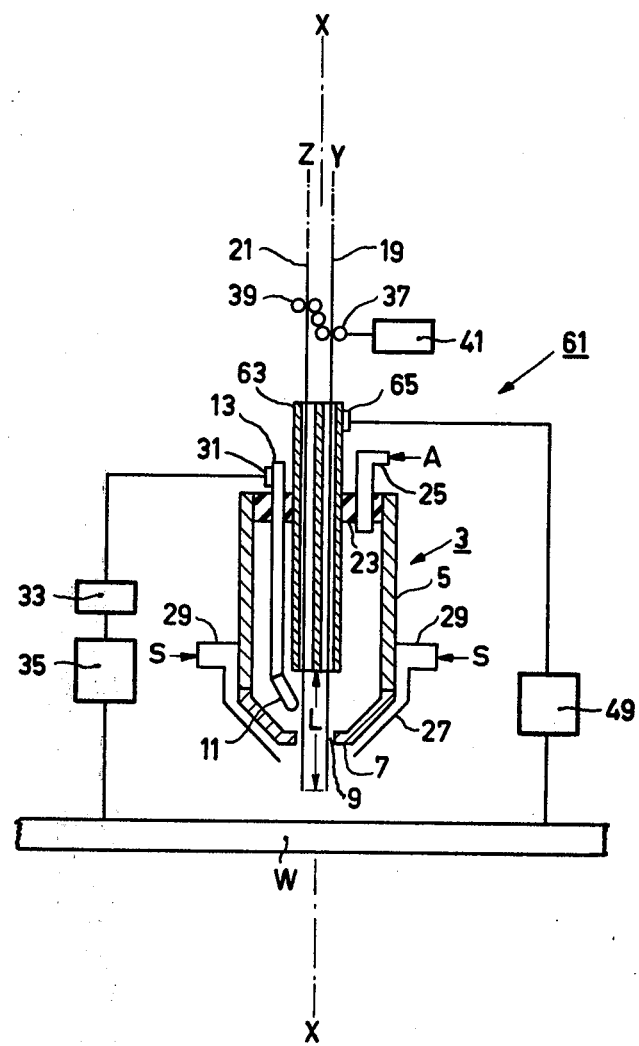

In the device 61 shown in FIG. 2, the two wire guides are combined to form a common contact member 63 which is centrally arranged in the housing 5. Via a connection terminal 65, the contact member 63 is connected to the second power supply source 49. The transport rollers 37 as well as the transport rollers 39 for the transport of the two welding wires 19 and 21 are driven by the electric motor 41. The third power supply source and a second electric motor for the separate driving of one of the welding wires is thus dispensed with in this embodiment.

Figure 3:
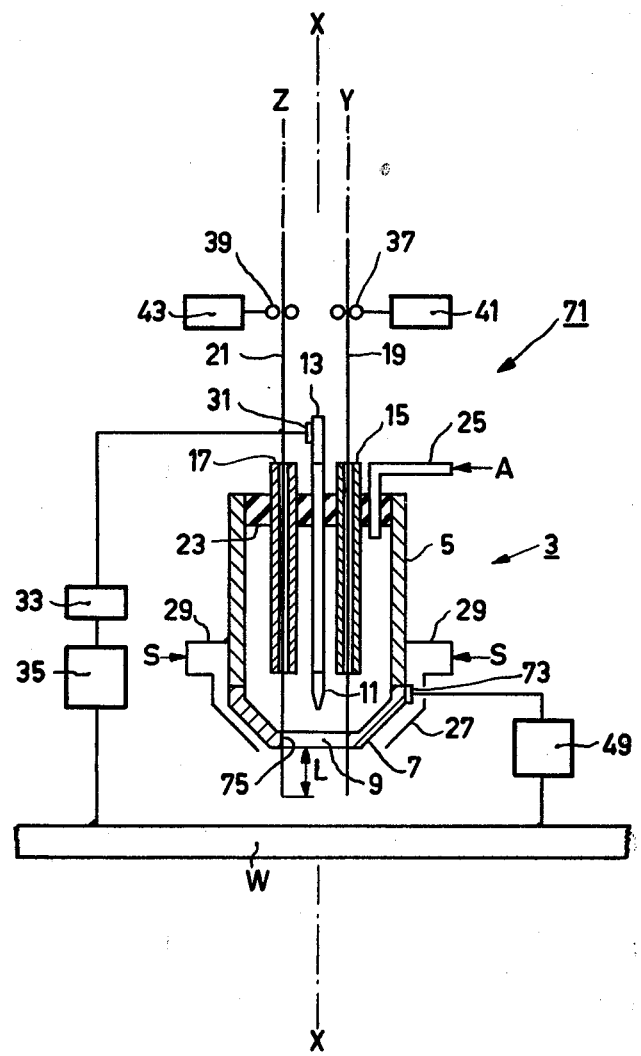

FIG. 3 shows a device 71 in which the nozzle 7 is constructed as a common contact member. To this end, the nozzle is connected, by means of a connection terminal 73, to the second power supply source 49. The two wire guides 15 and 17 are arranged in the housing 5 so that their central lines Y and Z, respectively, are substantially in alignment with the inner circumference 75 of the nozzle 7 which bounds the plasma aperture 9, so that the welding wires contact the inner circumference 75 during their displacement. In this embodiment the third power supply source is again eliminated. The two wire guides 15 and 17 are symmetrically arranged relative to the centrally-arranged plasma electrode 11 in the embodiment shown. Other arrangements of the plasma electrode and the wire guides are also possible, for example, an arrangement where the wire guides are adjacently situated and/or an eccentric arrangement of the plasma electrode.

Figure 4:
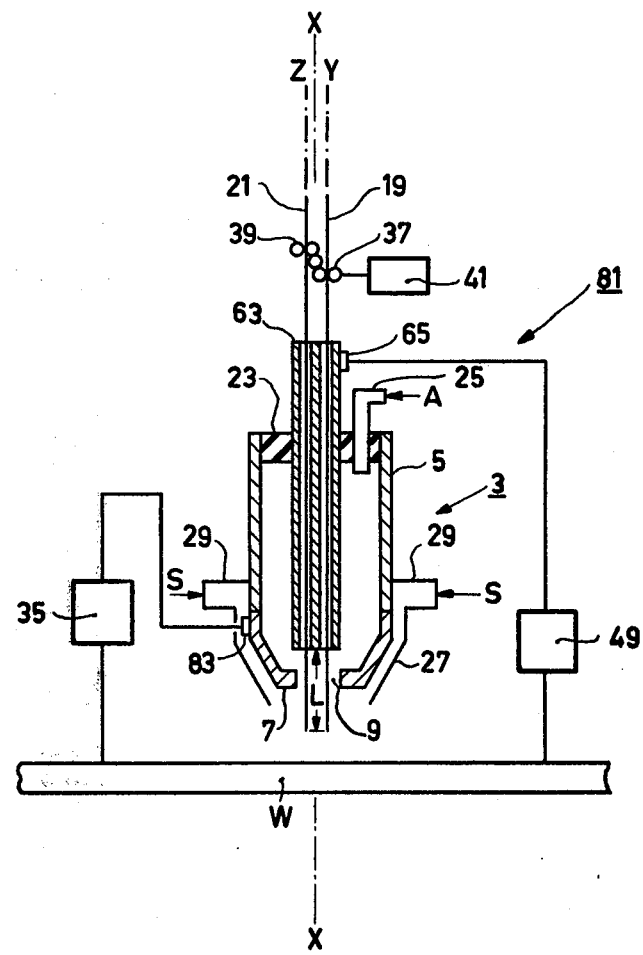

In the device 81 shown in FIG. 4, the nozzle 7 serves as a plasma electrode. To this end, the nozzle is connected to the first power supply source 35 by way of a connection terminal 83. Because a separate plasma electrode in the housing 5 is dispensed with, a compact torch construction of comparatively small dimensions is obtained. Moreover, the distance between the contact member 63 and the nozzle 7 may be comparatively short, so that this embodiment also enables welding with a comparatively short extension of the welding wires. The high-frequency generator 33 can be omitted in this embodiment, because the plasma arc is spontaneously ignited by the MIG-arcs which are simply struck by bringing the welding wires into contact with the workpiece.

During tests with wire guides which were provided in a common contact member, performed by means of a device, as shown in FIG. 2, the welding of mild steel was effected with positive polarity of the two welding wires, each with a diameter of 1.2 mm; the current intensity of the plasma arc amounted to 120 A at 43 V. The overall current intensity through the two welding wires was 520 A at 30 V. A total deposition rate of 252 g/min. was achieved, without rotation of the MIG-arcs. During comparative tests, performed with a single welding wire having a diameter equivalent to the sum of the diameters of the two said welding wires, i.e. a diameter of 1.7 mm, and corresponding further welding parameters, a maximum deposition rate of only 140 g/min. was reached.

For welding with a single welding wire having a diameter of 1.2 mm, the value of the critical current intensity lies at 470 A in certain given circumstances. In practically the same circumstances welding can be effected with two welding wires with a current intensity of 390 A through each welding wire, i.e. with a total current intensity of 780 A. The distance between the centre lines of the welding wires then amounted to 6 mm.

Using the method and the device in accordance with the invention, two or more welding wires of different composition and/or different diameter can be used, it moreover being possible to feed the welding wires at different rates.

The advantages according to the invention can also be maintained for the cladding of materials, where a rotary transfer of material is effected in a less controlled manner, for example: the cladding of a nickel alloy; the filling of narrow grooves at high deposition rates, where it is not possible to penetrate the groove with a rotating MIG-arc; the formation of given welding alloys by means of standard welding wires of different composition, for example for joining two workpieces of different material.

What is claimed is:

1. A method of plasma-MIG welding, which comprises flowing a thermally ionizable inert gas past a non-consumable electrode maintained at a positive polarity and out through a nozzle toward a workpiece; establishing a plasma arc between said non-consumable electrode and said workpiece to initiate and sustain a plasma flow; feeding a first consumable electrode maintained at a positive polarity through said plasma flow and out through said nozzle toward the workpiece; establishing a first MIG-arc between said first consumable electrode and said workpiece; separately feeding a second consumable electrode maintained at a positive polarity through said plasma flow and out through said nozzle toward the workpiece, the directions of feeding said two consumable electrodes being substantially parallel to each other and to the nozzle axis, there being an absence of contact between said two consumable electrodes throughout their entire lengths; and establishing a separate, second MIG-arc between said second consumable electrode and said workpiece.

2. A plasma-MIG welding torch, which comprises a housing provided with a nozzle; a non-consumable electrode disposed in said housing; first means associated with said non-consumable electrode to supply power thereto; and to maintain said non-consumable electrode at a positive polarity; means to feed two consumable electrodes through said housing and out through said nozzle in directions parallel to each other and to the nozzle axis without contact with each other; and second means associated with said feeding means to supply power either separately or jointly to said two consumable electrodes and to maintain said two consumable electrodes at a positive polarity.

3. A welding torch according to claim 2, in which the second means comprises two separate elements for individually supplying power to said two consumable electrodes.

4. A welding torch according to claim 2, in which the second means comprises a single element for jointly supplying power to said two consumable electrodes.

5. A welding torch according to claim 4, in which the center lines of the two consumable electrodes are respectively substantially in alignment with the circumference of the nozzle, said single element supplying power to said nozzle.

6. A welding torch according to claim 2, in which the non-consumable electrode is constituted by the nozzle.

7. A method of plasma-MIG welding according to claim 1, in which the two consumable electrodes have the same diameter and are spaced from each other a distance at least three times said diameter.

* * * * *